Patented Dec. 23, 1941

2,267,587

UNITED STATES PATENT OFFICE 2,267,587

INSECTICIDE

Robert R. Dreisbach, Fred W. Fletcher, and Merlin O. Keller, Midland, Mich., assignors to The Dow Chemical Company, Midland, Mich., a corporation of Michigan No Drawing. Application February 29, 1940, Serial No. 321,542

5 Claims. (Cl. 167—30)

This invention relates to insecticidal materials, and particularly to compositions in which trichloro-monofluoro-benzene is employed as a toxic ingredient.

Many synthetic organic materials have been suggested for use as insecticidal toxicants and as substitutes for pyrethrum, rotenone, and other natural occurring products. Almost without exception these toxicants are injurious to plant foliage so that their use must be carefully controlled both with respect to amounts and concentrations employed and time of application. A further disadvantage inherent in many of the synthetic toxicants heretofore employed has been their toxicity to humans and their incompatibility with other common insecticidal materials.

Benzene and its chlorinated analogues have been employed as insecticidal toxicants, but have proven unsatisfactory because of a tendency to produce severe injury to plant foliage. These compounds have also been found to be definitely toxic to humans.

We have discovered that trichloro-monofluoro-benzene is very effective as an insecticidal toxicant and that compositions comprising the same in the concentrations required for insect control may be applied to growing foliage according to standard spraying and dusting procedure without causing commercial injury thereto. Any suitable amount of this toxicant may be employed, from about 0.1 to about 5 per cent by weight of the toxicant in the composition being sufficient to control most insects.

The trichloro-monofluoro-benzene with which the present invention is concerned exists in several isomeric forms. The various isomers or mixtures thereof are readily dispersible in water, soluble in most organic solvents, readily absorbed by finely divided solid diluents and carriers and appear to have no toxicity to humans. The trichloro-monofluoro-benzene may be variously utilized to accomplish insect control, the determining factors with respect to the particular composition and concentration employed being the type of insect to be controlled and the circumstances under which such control is to be accomplished. For example, our new toxicant may be employed as a constituent of oil in water emulsions or in water dispersions with or without the addition of emulsifying, wetting, or dispersing agents. If desired the toxicant may be absorbed in or adsorbed on finely divided carriers such as diatomaceous earth, bentonite, talc, wood flour, and the like to obtain compositions adapted to be employed either as dusts or in water suspension. The toxicant also may be incorporated in other standard insecticidal compositions in combination with common insect poisons as lead arsenate, pyrethrum, rotenone, aromatic ethers and related compounds.

While the exact mechanics of the action of trichloro-monofluoro-benzene upon insect pests are difficult of determination, the new toxicant appears to function both as a stomach and contact poison. There is also evidence to the end that against certain insects the effectiveness is due in part to a fumigating action. Trichloro-monofluoro-benzene may be prepared by the direct chlorination of monofluoro-benzene and subsequent fractionation of the resulting mixed product to separate out the trichloro derivative. The chlorination reaction may be readily accomplished in the presence of iron or equivalent catalysts such as aluminum chloride, zinc chloride, iodine, and the like and at any suitable temperature not leading to the decomposition of the polyhalo-benzene derivative. The pure isomer may be separated from the mixed reaction product by fractional distillation or recrystallization from various organic solvents if desired. A mixed polychloro-monofluoro-benzene fraction boiling at between about 200° and 214° C. at 760° mm. pressure, and consisting essentially of the various trichloro-monofluoro-benzene isomers, is particularly effective as a toxic product. This fraction contains approximately 75 per cent of a crystalline isomer and approximately 25 per cent by weight of liquid isomers. The crystalline constituent freezes at between 62.2 and 63.5° C. The liquid constituent becomes cloudy at 4° C., solidifies at −5° C., and has a specific gravity of 1.5461 at 25°/25° C.

*Example 1*

20 parts by weight of a trichloro-monofluoro-benzene fraction boiling at 207°–210° C. at atmospheric pressure was dispersed in and on 80 parts by weight of diatomaceous earth. 15 pounds of this product was intimately mixed with sufficient water to give a spray composition comprising 3 pounds of toxicant per 100 gallons. This dispersion was applied to oak foliage heavily infested with oak leaf roller larvae. This treatment resulted in a 100 per cent mortality of the larvae in 72 hours. In an analogous determination lead arsenate at 3 pounds per 100 gallons of spray gave little reduction in the degree of larvae infestation 72 hours after application. The trichloro-monofluoro-benzene did not cause any burning of the individual leaves or otherwise appear to affect the tree. A similar lack of injury resulted when the spray material was applied to apple foliage.

*Example 2*

The spray composition as described in Example 1 was similarly employed for the control of Mexican bean beetle and Colorado potato beetle. In the bean beetle determination the spray containing the trichloro-monofluoro-benzene was 44 per cent effective. In a control determination, magnesium arsenate killed only 40 per cent of the beetle larvae.

The larvae of Colorado potato beetle was found somewhat more susceptible to the trichloro-monofluoro-benzene, the kill in two and three days being 80 and 85 per cent respectively. Lead arsenate at 3 pounds per 100 gallons when similarly applied for Colorado potato beetle control gave a kill of 48 and 86 per cent at the end of two and three day periods.

*Example 3*

A liquid trichloro-monofluoro-benzene fraction (having a specific gravity of 1.5461 at 25°/25° C. and boiling at from 200° to 214° C. at atmospheric pressure) was employed for the control of aphis. An aqueous dispersion of 3 pounds of the trichloro-monofluoro-benzene and 0.5 pound of the sodium salt of a sulphonated alcohol per 100 gallons of spray controlled 73 per cent of *Aphis rumicis*. In a similar application for the control of poplar aphis a 90 per cent kill was obtained.

Other modes of applying the principle of our invention may be employed instead of those explained, change being made as regards the material or the amounts employed provided the ingredients stated by any of the following claims or their equivalent be employed.

We therefore particularly point out and distinctly claim as our invention:

1. An insecticidal composition comprising trichloro-monofluoro-benzene as a toxic ingredient.

2. An insecticidal composition comprising as a toxic ingredient a trichloro-monofluoro-benzene fraction boiling at between 200° and 214° C. at 760 mm. pressure.

3. An insecticidal composition comprising diatomaceous earth and trichloro-monofluoro-benzene.

4. An insecticidal spray having trichloro-monofluoro-benzene dispersed therein as an active toxicant.

5. An insecticidal spray comprising a suspension of diatomaceous earth having dispersed therein trichloro-monofluoro-benzene.

ROBERT R. DREISBACH.
FRED W. FLETCHER.
MERLIN O. KELLER.